US012603837B1

(12) United States Patent

Mitchiner

(10) Patent No.: US 12,603,837 B1
(45) Date of Patent: Apr. 14, 2026

(54) METHOD AND SYSTEM FOR OPTIMIZATION OF NETWORK TRAFFIC BASED ON REINFORCEMENT LEARNING

(71) Applicant: CyKor LLC, Annapolis, MD (US)

(72) Inventor: Mark Mitchiner, San Diego, CA (US)

(73) Assignee: CyKor LLC, Annapolis, MD (US)

( * ) Notice: Subject to any disclaimer, the term of this patent is extended or adjusted under 35 U.S.C. 154(b) by 0 days.

(21) Appl. No.: 19/241,182

(22) Filed: Jun. 17, 2025

(51) Int. Cl.
*H04L 45/00* (2022.01)
*H04L 43/0829* (2022.01)
*H04L 43/087* (2022.01)
*H04L 43/0876* (2022.01)

(52) U.S. Cl.
CPC .......... *H04L 45/38* (2013.01); *H04L 43/0829* (2013.01); *H04L 43/087* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 10,560,494 B2 | 2/2020 | Wiley et al. | |
| 10,757,121 B2 | 8/2020 | Dasgupta et al. | |
| 11,758,419 B2 | 9/2023 | Hwang et al. | |
| 12,143,941 B1 | 11/2024 | Duong | |
| 12,192,820 B2 | 1/2025 | Yeh et al. | |
| 2021/0328933 A1 | 10/2021 | Thyagaturu et al. | |

(Continued)

FOREIGN PATENT DOCUMENTS

| | | |
|---|---|---|
| CN | 109922004 A | 6/2019 |
| CN | 115766241 A | 3/2023 |

(Continued)

OTHER PUBLICATIONS

C. Liu, M. Xu, Y. Yang and N. Geng, "DRL-OR: Deep Reinforcement Learning-based Online Routing for Multi-type Service Requirements," IEEE INFOCOM 2021—IEEE Conference on Computer Communications, Vancouver, BC, Canada, 2021, pp. 1-10, doi: 10.1109/INFOCOM42981.2021.9468736.

(Continued)

*Primary Examiner* — Xavier S Wong
(74) *Attorney, Agent, or Firm* — Scale LLP

(57) ABSTRACT

A system for optimizing network traffic distribution including a control plane connected to a data plane. The control plane includes one or more processors and memory storing instructions that, when executed by the one or more processors, cause the control plane to: implement a reinforcement learning module configured to: model a network state space comprising interface characteristics and traffic characteristics; define an action space for allocating specific flows to specific interfaces; establish a reward function that encourages efficient utilization of bandwidth while penalizing packet loss, latency, and jitter; learn optimal flow-to-interface allocations based on the modeled state space, action space, and reward function; and implement a flow allocation module configured to generate flow allocation policies based on the learned optimal flow-to-interface allocations. The data plane including one or more network devices configured to route network traffic flows based on the implemented flow allocation policies.

20 Claims, 5 Drawing Sheets

300

302 — Implement a reinforcement learning (RL) module

304 — Cause the RL module to model a network state space comprising interface characteristics and traffic characteristics 306 — Cause the RL module to define an action space for allocating specific flows to specific interfaces 308 — Establish a reward function that encourages efficient utilization of bandwidth while penalizing packet loss, latency, and jitter 310 — Cause the RL module to learn optimal flow-to-interface allocations based on the modeled state space, action space, and reward function 312 — Implement a flow allocation module 314 — Cause the flow allocation module to generate flow allocation policies based on the learned optimal flow-to-interface allocations

(56) References Cited

U.S. PATENT DOCUMENTS

| | | | |
|---|---|---|---|
| 2022/0109622 A1 | 4/2022 | Yeh et al. | |
| 2022/0215204 A1* | 7/2022 | Devi ................. | G06F 18/24133 |
| 2023/0145097 A1* | 5/2023 | Kiran .................. | H04L 47/2483 |
| | | | 370/235 |
| 2023/0319163 A1* | 10/2023 | Forero .................... | H04L 47/22 |
| | | | 709/224 |
| 2023/0362095 A1* | 11/2023 | Tian .................... | H04L 43/0882 |
| 2024/0056885 A1* | 2/2024 | Zhu ....................... | H04W 76/15 |
| 2024/0259879 A1* | 8/2024 | Ranganath .......... | H04L 41/5054 |

FOREIGN PATENT DOCUMENTS

| | | |
|---|---|---|
| CN | 116389347 A | 7/2023 |
| CN | 116455820 A | 7/2023 |
| CN | 118282919 A | 7/2024 |
| CN | 118509325 A | 8/2024 |
| EP | 4290917 A2 | 12/2023 |
| WO | 2013072776 A2 | 5/2013 |

OTHER PUBLICATIONS

R. R. d. Santos, E, K. Viegas, A. O. Santin and V. V. Cogo, "Reinforcement Learning for Intrusion Detection: More Model Longness and Fewer Updates," In IEEE Transactions on Network and Service Management, vol. 20, No. 2, pp. 2040-2055, Jun. 2023, doi: 10.1109/TNSM.2022.3207094.

V. Mnih et al., "Asynchronous Methods for Deep Reinforcement Learning" arXiv:1602.01783v2 [cs.LG] Jun. 16, 2018.

Y. Tian et al., "Traffic Engineering In Partially Deployed Segment Routing Over IPv6 Network With Deep Reinforcement Learning," in IEEE/ACM Transactions on Networking, vol. 28, No. 4, pp. 1573-1586, Aug. 2020, doi: 10.1109/TNET.2020.2987866.

* cited by examiner

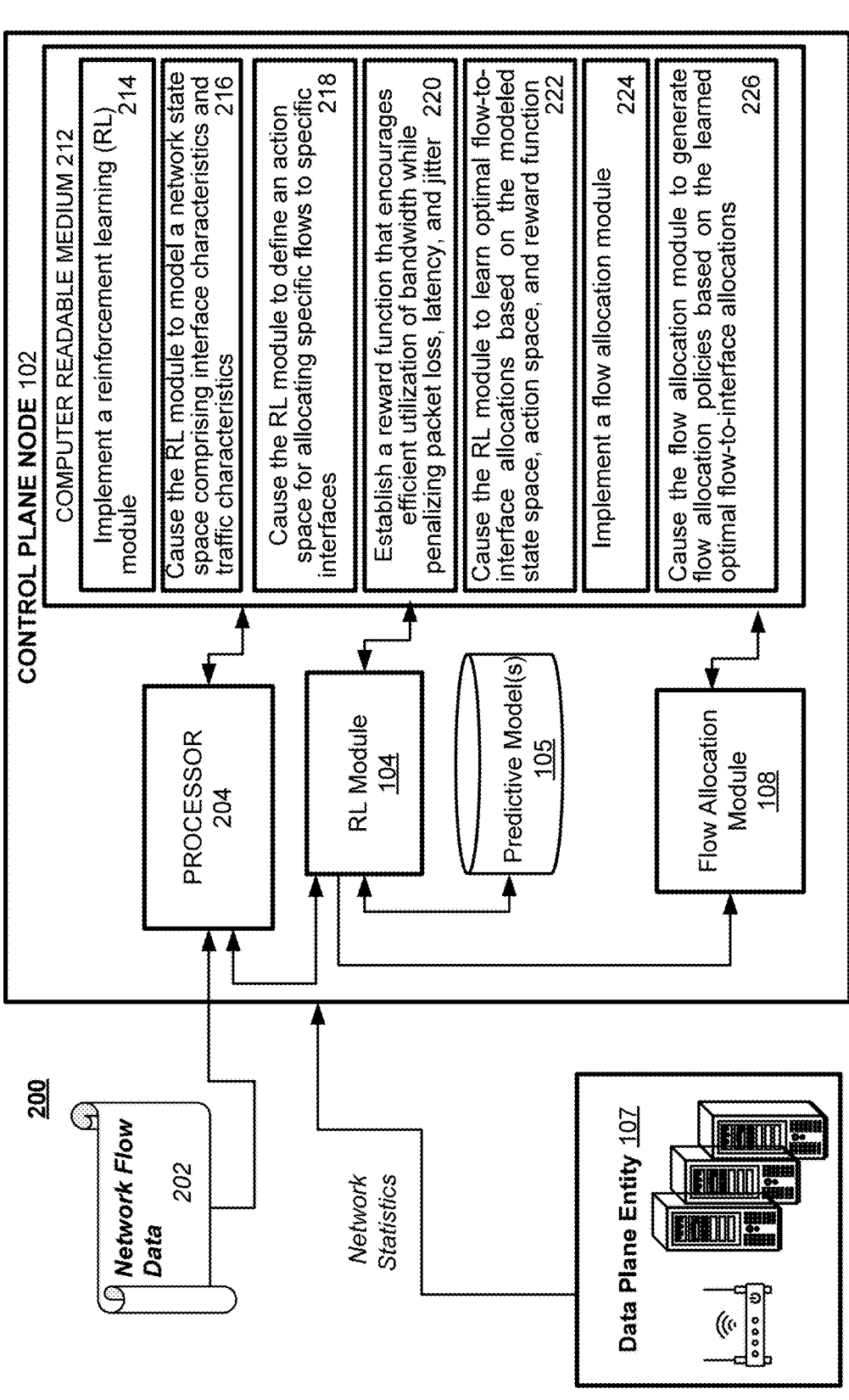

CONTROL PLANE NODE 102

COMPUTER READABLE MEDIUM 212

Implement a reinforcement learning (RL) module 214

Cause the RL module to model a network state space comprising interface characteristics and traffic characteristics 216

Cause the RL module to define an action space for allocating specific flows to specific interfaces 218

Establish a reward function that encourages efficient utilization of bandwidth while penalizing packet loss, latency, and jitter 220

Cause the RL module to learn optimal flow-to-interface allocations based on the modeled state space, action space, and reward function 222

Implement a flow allocation module 224

Cause the flow allocation module to generate flow allocation policies based on the learned optimal flow-to-interface allocations 226

PROCESSOR 204

RL Module 104

Predictive Model(s) 105

Flow Allocation Module 108

200

*Network Flow Data* 202

*Network Statistics*

Data Plane Entity 107

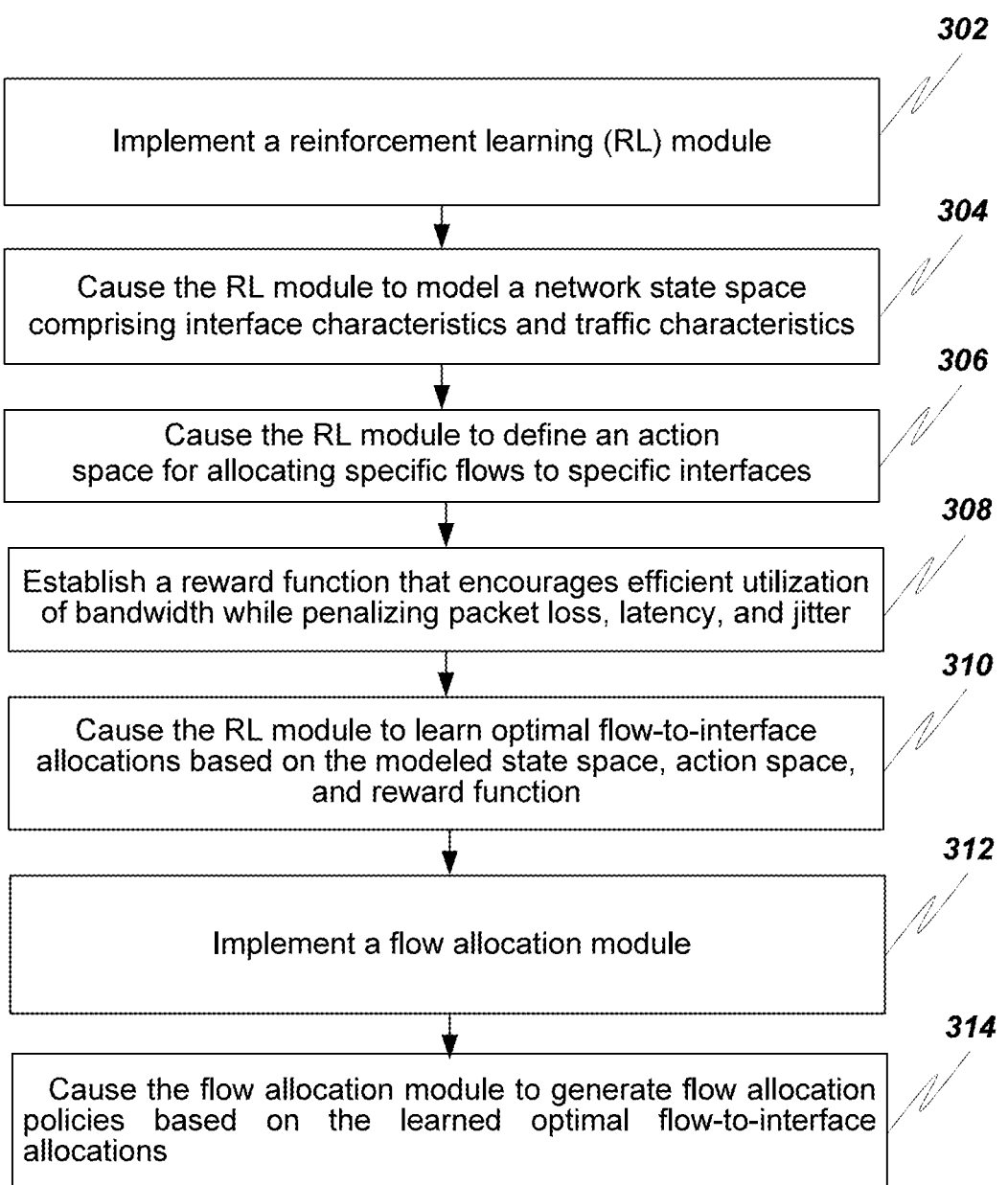

Implement a reinforcement learning (RL) module

Cause the RL module to model a network state space comprising interface characteristics and traffic characteristics Cause the RL module to define an action space for allocating specific flows to specific interfaces Establish a reward function that encourages efficient utilization of bandwidth while penalizing packet loss, latency, and jitter Cause the RL module to learn optimal flow-to-interface allocations based on the modeled state space, action space, and reward function Implement a flow allocation module Cause the flow allocation module to generate flow allocation policies based on the learned optimal flow-to-interface allocations

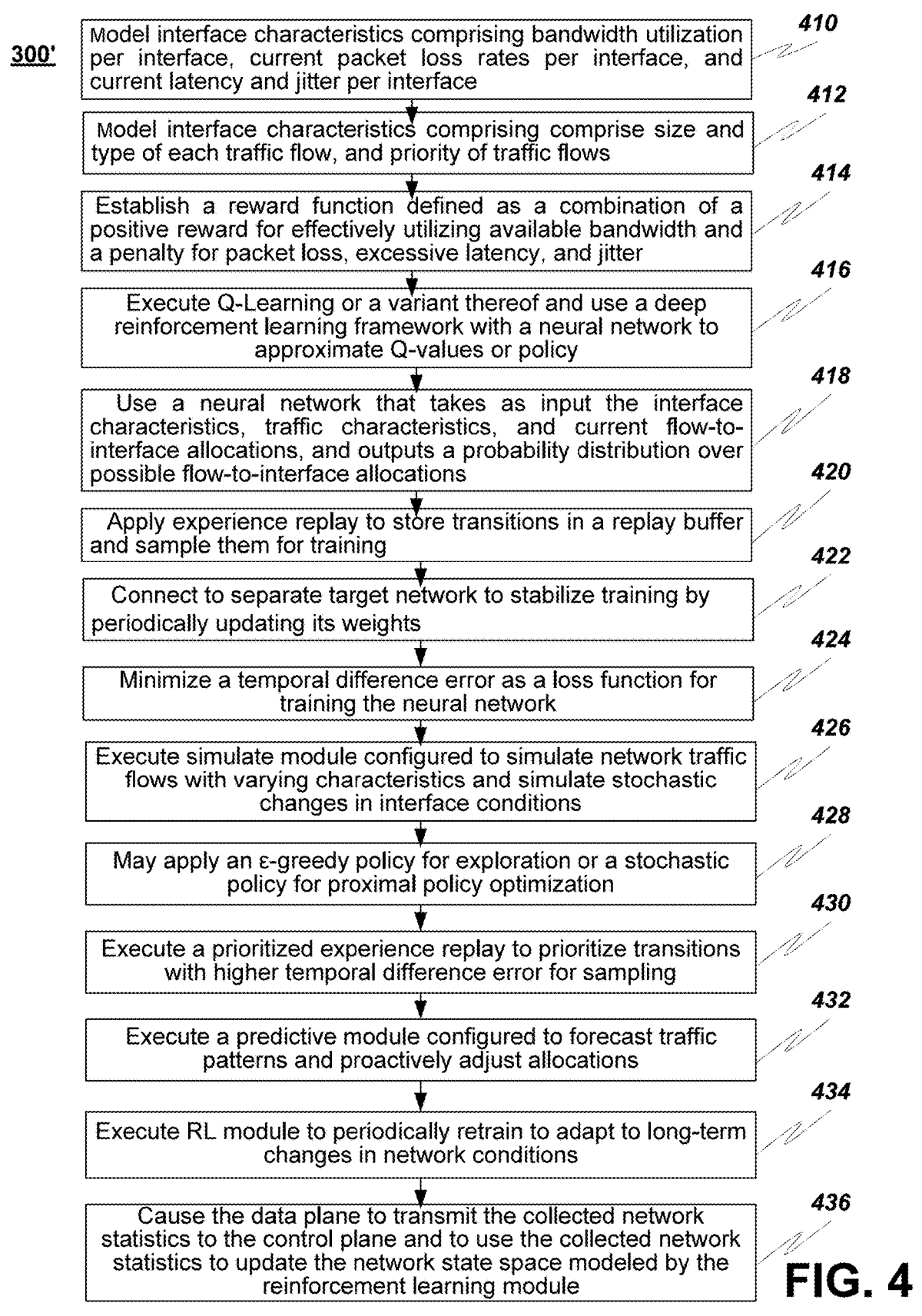

Model interface characteristics comprising bandwidth utilization per interface, current packet loss rates per interface, and current latency and jitter per interface — *410*

Model interface characteristics comprising comprise size and type of each traffic flow, and priority of traffic flows — *412*

Establish a reward function defined as a combination of a positive reward for effectively utilizing available bandwidth and a penalty for packet loss, excessive latency, and jitter — *414*

Execute Q-Learning or a variant thereof and use a deep reinforcement learning framework with a neural network to approximate Q-values or policy — *416*

Use a neural network that takes as input the interface characteristics, traffic characteristics, and current flow-to-interface allocations, and outputs a probability distribution over possible flow-to-interface allocations — *418*

Apply experience replay to store transitions in a replay buffer and sample them for training — *420*

Connect to separate target network to stabilize training by periodically updating its weights — *422*

Minimize a temporal difference error as a loss function for training the neural network — *424*

Execute simulate module configured to simulate network traffic flows with varying characteristics and simulate stochastic changes in interface conditions — *426*

May apply an ε-greedy policy for exploration or a stochastic policy for proximal policy optimization — *428*

Execute a prioritized experience replay to prioritize transitions with higher temporal difference error for sampling — *430*

Execute a predictive module configured to forecast traffic patterns and proactively adjust allocations — *432*

Execute RL module to periodically retrain to adapt to long-term changes in network conditions — *434*

Cause the data plane to transmit the collected network statistics to the control plane and to use the collected network statistics to update the network state space modeled by the reinforcement learning module — *436*

FIG. 4

METHOD AND SYSTEM FOR OPTIMIZATION OF NETWORK TRAFFIC BASED ON REINFORCEMENT LEARNING

FIELD OF DISCLOSURE

The present disclosure generally relates to network traffic optimization, and more particularly, to an automated system and method for real-time network traffic optimization using reinforcement learning for bin packing of network flows.

BACKGROUND

The growth of Internet traffic has increased by orders of magnitude over the last 4 decades. Most recently, this has been driven by video streaming services, social media, E-commerce and the rollout of 5G networks. Across Service Providers, content providers, Enterprises and government networks, the need for effective bandwidth utilization and the efficient use of all available bandwidth is crucial for the expected aggregate growth of these networks.

The transport and data center networks of many providers have multiple ingress and egress interfaces to the same destinations, in order to distribute traffic across a set of links. This may be due cost, and the current limit of LAN and WAN technologies. Traditional routing protocols, such as BGP, OSPF, ISIS, EIGRP and RIP, do a poor job of effectively distributing traffic load across a set of defined interfaces. That is, for a set of interfaces with the same link speed, a routing protocol can implement Equal Cost Multipath (ECMP) to distribute the traffic load across these multiple paths.

To implement this, the set of interfaces have an equal cost or weight assigned to each link. A routing protocol implementing ECMP-based traffic distribution typically involves utilizing a hash-based method (such as hashing on the source and destination IP addresses, port and/or protocols) to select which interface a flow will be assigned to reach its destination. However, conventional routing protocols have no knowledge of the size if the traffic flows that are assigned to a giving interface. Routing protocols work in the control plane, whereas traffic moving through a network work in the data plane. The control plane is essentially orthogonal to the data plane, which can lead to underutilization or overutilization of a link or links in an ECMP set. Furthermore, the use of end-to-end encryption in transport network, and the characteristics of AI workload traffic in data centers present additional challenges of uneven load distribution, due to the low entropy of network traffic. This leads to polarization of network traffic to a single link, and ineffective traffic distribution across parallel paths.

Because of its widespread use cases, such as e-commerce and web browsing, TCP constitutes up to 90% of the traffic. However, TCP throughput is extremely sensitive to latency, jitter and in particular packet loss, due to the protocol congestion control and retransmission mechanisms. For example, a TCP flow that experiences as little as 1% packet loss can experience a total decrease in throughput of over 90%.

Conventional network flow routing systems do not provide for effective bandwidth utilization and the efficient use of all available bandwidth. The existing methods of network flow routing do not apply network traffic optimization using reinforcement learning.

Accordingly, automated system and method for real-time network traffic optimization using reinforcement learning for bin packing of network flows are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for optimizing network traffic distribution including a control plane connected to a data plane. The control plane includes one or more processors and memory storing instructions that, when executed by the one or more processors, cause the control plane to: implement a reinforcement learning module configured to: model a network state space comprising interface characteristics and traffic characteristics; define an action space for allocating specific flows to specific interfaces; establish a reward function that encourages efficient utilization of bandwidth while penalizing packet loss, latency, and jitter; learn optimal flow-to-interface allocations based on the modeled state space, action space, and reward function; and implement a flow allocation module configured to generate flow allocation policies based on the learned optimal flow-to-interface allocations. The data plane including one or more network devices configured to: implement the flow allocation policies generated by the flow allocation module; collect network statistics including bandwidth utilization, packet loss rates, latency, and jitter for each interface; and route network traffic flows based on the implemented flow allocation policies.

Another embodiment of the present disclosure provides a method that includes one or more of the steps: implementing a reinforcement learning (RL) module; modeling, by the RL module, a network state space comprising interface characteristics and traffic characteristics; defining, by the RL module, an action space for allocating specific flows to specific interfaces; establishing, by the RL module, a reward function that encourages efficient utilization of bandwidth while penalizing packet loss, latency, and jitter; learning optimal flow-to-interface allocations based on the modeled state space, action space, and reward function; and implementing a flow allocation module; generating, by the flow allocation module, flow allocation policies based on the learned optimal flow-to-interface allocations; and implementing, in a data pane, the flow allocation policies generated by the flow allocation module; collecting, by at least one network device of the data plane, network statistics including bandwidth utilization, packet loss rates, latency, and jitter for each interface; and routing network traffic flows based on the implemented flow allocation policies.

Another embodiment of the present disclosure provides a computer-readable medium including instructions for: implementing a reinforcement learning (RL) module; modeling, by the RL module, a network state space comprising interface characteristics and traffic characteristics; defining, by the RL module, an action space for allocating specific flows to specific interfaces; establishing, by the RL module, a reward function that encourages efficient utilization of bandwidth while penalizing packet loss, latency, and jitter; learning optimal flow-to-interface allocations based on the modeled state space, action space, and reward function; and implementing a flow allocation module; generating, by the flow allocation module, flow allocation policies based on the learned optimal flow-to-interface allocations; and implementing, in a data pane, the flow allocation policies generated by the flow allocation module; collecting, by at least one network device of the data plane, network statistics including bandwidth utilization, packet loss rates, latency, and jitter for each interface; and routing network traffic flows based on the implemented flow allocation policies.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 2 illustrates a network diagram of a system including detailed features of a control plane node consistent with the present disclosure;

FIG. 3 illustrates a flowchart of a method for network traffic optimization using reinforcement learning for bin packing of network flows consistent with the present disclosure;

FIG. 4 illustrates a further flowchart of a method for network traffic optimization using reinforcement learning for bin packing of network flows consistent with the present disclosure;

DETAILED DESCRIPTION

Figure 1:
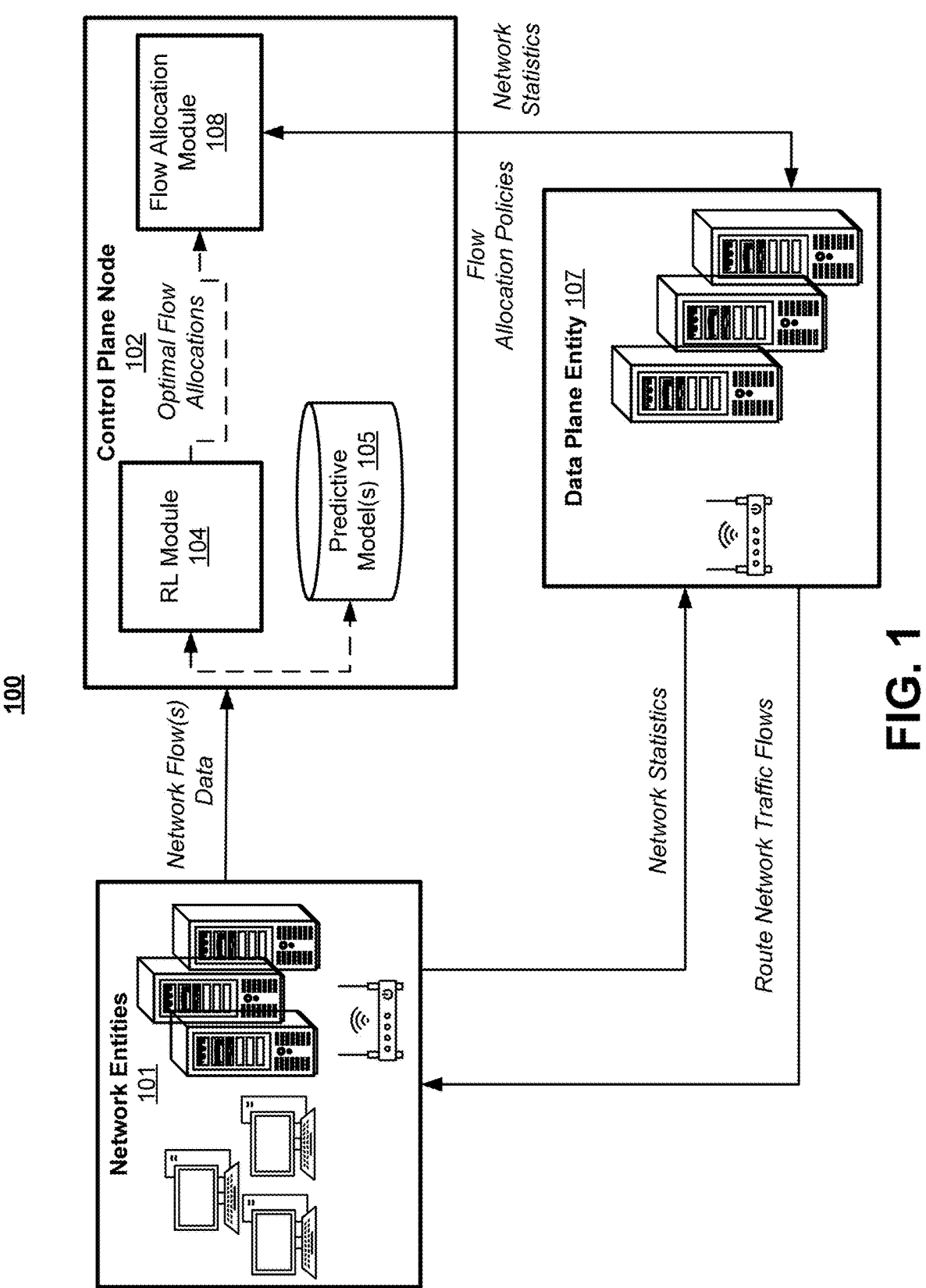
FIG. 1 illustrates a network diagram of a system for real-time network traffic optimization using reinforcement learning for bin packing of network flows consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The terminology used herein may be interpreted in its broadest reasonable manner, even though it is being used in conjunction with a Detailed Description of certain specific examples of the present disclosure. Indeed, certain terms may even be emphasized above, however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

As used herein, the terms "transmit," "provide," "receive," and "obtain" may refer to the transfer or communication of data, information, or signals between various components or entities. This may include, but is not limited to, transmission over a network (such as a local area network, wide area network, or the Internet), transfer between devices (such as between computers, smartphones, or other electronic devices), communication between central processing units (CPUs) or graphics processing units (GPUs), exchange of information between microservices, transfer of data between software components within an environment, or any other form of data transfer or communication as indicated by the context in which the terms are used. The specific mode or medium of transmission or provision may vary depending on the particular implementation and system architecture.

As used herein, the term "module" may refer to software code, a software component, a software function, a software application, and firmware. As indicated by context, "module" may be logical, digital, analog, optical, electronic, or quantum implementations of operations or functions. A module may be implemented as a standalone unit or as part of a larger system. In some cases, a module may interact with other modules or components to perform specific tasks or operations within the system. As indicated by context or based on design preference, any two modules may be combined. As indicated by context or based on design preference, any module may be broken into two or more modules that provide some or all of the operations or functions of the single module. The specific implementation of module(s) may vary depending on the requirements of the system and the particular application.

The following definitions may be used in the present disclosure.

"A predictive model" refers to machine learning model trained on network-related data to predict various outcomes or characteristics for optimal network traffic flow routing. This model takes the network flow data as input and outputs predictions about a set of parameters related to network traffic flow routing.

"Bin packing of network flows" refers to the problem of efficiently assigning tasks (i.e., items or packets) to available resources represented by bins or interfaces while respecting capacity constraints and time windows. The bin packing of the network flows aims to maximizes the efficiency and/or utilization of the bins.

"Control plane", in network routing, refers equipment responsible for making decisions about how data packets should be routed. The control plane uses routing protocols and algorithms to determine the best path for data, including establishing network topology and managing routing tables.

"Data plane", in network routing, refers to the equipment that actually forwards the packets along the best path for data determined by the control plane.

The present disclosure includes many aspects and features. Moreover, while many aspects and features relate to, and are described in the context of network flow allocations, embodiments of the present disclosure are not limited to use only in this context.

The present disclosure provides a system, method and computer-readable medium for real-time network traffic optimization using reinforcement learning for bin packing of network flows.

Layer 3 (L3) devices, such as routers or switches, run routing protocols to determine the best path (or paths) for data packets to travel between different networks. The transport networks of many providers, often comprised of many L3 nodes, typically have multiple ingress and egress interfaces to the same destinations, to evenly distribute traffic across a set of links. This architecture may be driven by the cost of high-speed links, or due to current limitations of LAN and WAN technologies and interface speeds. Traditional routing protocols, such as BGP, OSPF, ISIS, EIGRP and RIP, do a poor job of effectively distributing traffic load across a set of defined interfaces. That is, for a set of interfaces with the same link speed (or other cost metric(s) with the same metrics or within a threshold similarity of the same metrics), a routing protocol can implement Equal-Cost Multi-Path (ECMP) to distribute the traffic load across these multiple paths. To implement this, the set of interfaces would have an equal cost or weight assigned to each link. A routing protocol implementing ECMP-based traffic distribution typically involves utilizing a hash-based method (such as hashing on the source and destination IP addresses, port and/or protocols) to select which interface a flow will be sent to in order to reach its destination.

While routing protocols may implement ECMP hash methods for load distribution for a set of equal-cost links, these protocols have no knowledge of the size of the traffic flows that are assigned to a giving interface. That is, once a routing protocol assigns a given flow to a particular interface, those traffic flows are no longer tracked or measured, unless there is a failure on that link. Similarly, for a set of unequal speed links, such as a mix of 1 Gigabit and 10 Gigabit interfaces, where the cost is configured identically, traffic would be applied to each interface such that the 1 Gig interface(s) would be oversubscribed, and the 10 Gig interface(s) may be underutilized. Finally, there exists a class of interfaces where the available bandwidth varies over time. This is common in SATCOM uplink/downlink between mobile nodes and ground stations.

The root of the issue lies in the separation of responsibilities between the control plane and the data plane. Routing protocols, which operate within the control plane, are responsible for determining the best logical paths for data transmission across the network. In contrast, the actual movement of traffic flows occurs in the data plane, where packets are forwarded based on the decisions made by the control plane. This separation creates a dynamic where the control plane's decisions do not account for real-time traffic conditions in the data plane. The control plane and routing decisions made by the control plane are essentially orthogonal to the data plane, and no scalable mechanism for a control plane protocol to measure or react to congestion or bottlenecks in the data plane. As a result, in scenarios like ECMP routing, certain links within the set may become underutilized while others are overutilization, leading to inefficient network utilization and even bottlenecks across the network. Finally, the underutilization or overutilization of interfaces may be compounded by the implementation of overlay networks, which can limit the data that can be hashed against and may lead to polarization of flows to a single (or subset of) egress interface. If there is insufficient variability in the hash inputs, multiple flows may get mapped to the same path, leading to polarization where only a subset of available paths are utilized.

Another technology administrators have deployed to solve this bandwidth utilization issue is MPLS Traffic Engineering (MPLS-TE). MPLS TE is popular with Service Providers (SP), allowing enhanced QoS, deterministic routing and fast rerouting mechanisms. However, MPLS Traffic Engineering is typically configured in a static manner and is unaware of the traffic load sent over the configured MPLS TE tunnels. This technology is not well suited to the dynamic nature of today's SP and content provider networks with respect to optimal load distribution.

Because of its widespread use cases, such as e-commerce and web browsing, TCP constitutes up to 90% of the traffic on the Internet. However, the underutilization or overutilization of network links is largely due to the dynamic nature of TCP flows across the network. When a new flow is assigned to an interface, the bandwidth consumed by that flow is relatively low to begin with, due to TCP's slow start mechanism. The size of a flow will increase exponentially over time, as the protocol transitions from the slow start to the congestion avoidance phase, where the algorithm will react to packet loss to detect congestion and decrease its capacity. Thus, the bandwidth consumed by a flow may oscillate as it reacts to dynamic network conditions. This assumes that the packet loss during the life of a flow is relatively uniform.

Furthermore, TCP throughput is extremely sensitive to latency, jitter and in particular packet loss, due to the protocol congestion control and retransmission mechanisms. For example, a TCP flow that experiences as little as 1% packet loss can experience a total decrease in throughput of over 90%. Compounding the difficult nature of managing load distribution, flows can be characterized as elephant flows (large, long-lived flows that consume a significant amount of bandwidth), and mice flows (small, short-lived flows that contribute to a large proportion of flow count).

Below are the set of network and flow attributes that vary over time: Number of equal-cost links to a destination in an ECMP set, Number of flows on a link, Bandwidth of each link in the ECMP set (including dynamic bandwidth interfaces), Size of each flow (dynamic, varies over time), Latency across links (dynamic, varies over time), Packet loss on links (dynamic, varies over time), and/or Jitter on links (dynamic, varies over time).

For all these reason, effective load distribution and network utilization optimization, given the current set of available routing protocols, is a particularly complex problem to solve. The present disclosure is directed to overcome the above-referenced challenges—solving optimal routing protocol load distribution of flows across a set of links based upon network load and available bandwidth. Because this problem set is NP-hard, methods and systems are disclosed for Reinforcement Learning systems to augment routing protocols to optimally pack a set of items (data flows) of varying sizes into a finite number of bins (interfaces).

To determine the optimal assignment of flows to interfaces, telemetry data must be obtained in real time for each interface in a load distribution set. Probes will be sent down each interface from the source interface of each routed path to its destination's next-hop address. The return of each probe for each interface will allow source Layer3 node to gather latency, jitter and packet loss.

Reinforcement Learning (RL) is a machine learning paradigm where an agent learns to make decisions through interactions with its environment. The agent observes states, selects actions, and receives rewards or penalties, aiming to maximize cumulative reward. Q-learning, a model-free RL algorithm, uses Q-values to estimate the expected future rewards for state-action pairs and iteratively improves the agent's policy to achieve optimal behavior. However, Q-Learning struggles with environments where the state space is large or continuous, because it relies on storing and updating Q-values for every possible state-action pair. In practical situations, like network routing, the state space can be too vast or continuous to represent as a simple table.

In contrast, Deep Q-Networks (DQN) enhances Q-learning by using deep neural networks to approximate the Q-value function, enabling the agent to handle more complex and high-dimensional state spaces. DQN utilizes a neural network to approximate the Q-value function, which allows it to generalize across states and efficiently handle continuous state spaces. In a network routing context, states could involve numerous factors, which would be difficult to represent explicitly in a table. DQN is more appropriate in this context because it allows the agent to learn from a broader range of complex, high-dimensional state spaces, generalize across similar states, and adapt to dynamic environments. In network routing, where states such as load, congestion, latency and loss are continuous and ever-changing, DQN's use of a deep neural network to approximate Q-values offers a more scalable, efficient, and robust approach than traditional Q-learning.

The present disclosure proposes leveraging DQN to optimize routing protocol load distribution across a network, dynamically adjusting the assignment of flows to interfaces based on the current load to minimize congestion and prevent interface oversubscription.

In one embodiment, a machine-learning algorithm using reinforcement learning (e.g., Q-Learning) is used to allocate network flows onto interfaces so that as much bandwidth as possible traverses the interface, as fast as possible.

According to the discloses embodiments, to optimize the allocation of network flows onto interfaces using reinforcement learning, a framework is provided where the goal is to maximize the effective utilization of bandwidth while minimizing packet loss, latency, and jitter. The discloses novel solution is implemented as follows.

Modeling is performed based state space representing the current network conditions, which include:
Interface Characteristics:
  Bandwidth utilization per interface;
  Current packet loss rates per interface;
  Current latency and jitter per interface.

Traffic Characteristics:

Size and type of each traffic flow (e.g., TCP or UDP);

Priority of traffic flows (e.g., latency-sensitive or band-width-intensive).

Modeling may be also performed based on action space. The actions represent decisions to allocate specific flows to specific interfaces—for each flow, decide which interface it should be routed to.

In one embodiment, a reward function is implemented. The reward function encourages efficient utilization of bandwidth while avoiding packet loss, latency, and jitter. For example, a positive reward may be given for effectively utilizing available bandwidth a shown in the following example:

EXAMPLE $$R_{\text{utilization}} = \frac{\text{Used Bandwidth}}{\text{Total Available Bandwidth}}.$$

The penalty may be given for packet loss, excessive latency, and jitter. For example:

$$R_{\text{penalty}} = -\alpha(\text{Packet Loss Rate}) - \beta(\text{Latency}) - \gamma(\text{Jitter}).$$

The total reward is calculated as:

$$R = R_{\text{utilization}} + R_{\text{penalty}}$$

The transitions depend on the stochastic nature of network conditions:

Traffic patterns (e.g., burstiness of flows);

Variations in packet loss, latency, and jitter due to congestion or link failures.

According to the disclosed embodiments, a Reinforcement Learning (RL) Algorithm is implemented. In one embodiment, Q-Learning or its advanced variants may be used to solve this problem. For large-scale networks, a deep reinforcement learning (DRL) approach such as Deep Q-Network (DQN) or Proximal Policy Optimization (PPO) may be used.

Q-Learning estimates the value of taking an action $a$ in state $s$:

$$Q(s,a) \gets Q(s,a) + \alpha \Big[r + \gamma \max_{a'} Q(s', a') - Q(s, a)\Big], \text{ where:}$$

$\alpha$—Learning rate;

$\gamma$—Discount factor;

$r$—Reward;

$s'$—Next state.

In one embodiment, a Deep Reinforcement Learning (DRL) Framework may be used. For scalability, the DRL may be used with a neural network to approximate the Q-values or policy.

The input features used by the neural network are:

Interface characteristics (bandwidth, packet loss, latency, jitter);

Traffic characteristics (flow size, type, priority);

Current flow-to-interface allocations.

The outputs of the neural network reflect a probability distribution over possible flow-to-interface allocations.

The training of the models is implemented as follows:

1. Experience Replay: Store transitions $(s,a,r,s')$ in a replay buffer and sample them for training to improve data efficiency.

2. Target Network: Use a separate target network to stabilize training by periodically updating its weights.

3. Loss Function: Minimize the temporal difference (TD) error:

$$\text{Loss} = \mathbb{E}\big[(r + \gamma \max_{a'} Q(s', a') - Q(s, a))^2\big]$$

The workflow of the algorithm of the disclosed method is as follows:

1. Initialization:

Initialize the Q-network (or policy network);

Initialize the replay buffer and target network.

2. Traffic Simulation:

Simulate network traffic flows with varying characteristics;

Simulate stochastic changes in interface conditions (e.g., congestion, packet loss).

3. Exploration vs Exploitation:

Use an $\epsilon$-greedy policy for exploration (or a stochastic policy for PPO).

4. Action Execution: Allocate traffic flows to interfaces based on the chosen action.

5. Reward Calculation:

Compute the reward based on bandwidth utilization, packet loss, latency, and jitter.

6. Update Q-Values or Policy:

For Q-Learning, update Q-values using the update rule;

For DQN/PPO, update the neural network using the loss function.

7. Repeat:

Continue until convergence or a specified number of iterations.

Advanced Optimization is implemented as follows.

Prioritized Experience Replay: Prioritize transitions with higher TD error for sampling to focus on hard-to-learn cases.

Multi-Agent RL: Use a multi-agent approach where each agent manages flows for a specific interface, and agents coordinate to optimize global performance.

Traffic Prediction: Incorporate a predictive model to forecast traffic patterns and proactively adjust allocations.

According to the disclosed embodiments, the following evaluation metrics may be used:

Total bandwidth utilization across all interfaces;

Average packet loss, latency, and jitter;

Convergence time of the RL algorithm;

Scalability to larger networks with more interfaces and traffic flows.

As discussed above, the system overcomes the limitations of existing methods of network flow allocations by employing fine-tuned models to ingest and process the network flow data, irrespective of data format, style, or data type. By leveraging the capabilities of the pre-trained predictive models, the disclosed approach offers a significant improvement over existing solutions discussed above in the background section.

In one embodiment, to enhance this process, the system may integrate advanced technologies discussed above, such as Artificial Intelligence (AI) and machine-learning (ML) and Reinforcement Learning (RL). The RL may be leveraged for several key functions discussed herein. In one embodiment, the RL may use artificial neural networks (ANNs) as function approximators. The ANNs may be used to represent and learn the optimal flow allocation policy or value function in RL algorithms.

In one embodiment, the RL module may use the predictive model(s) that use an artificial neural network (ANN), a non-linear modeling approach to extract quantitative features from the network flow data to generate predictive network flow allocations. The use of specially trained ANNs provides a number of improvements over traditional methods of analyzing of network flow data received, including more accurate network flow allocations.

In one embodiment, the ANN can be implemented by means of computer-executable instructions, hardware, or a combination of the computer-executable instructions and hardware. In one embodiment, neurons of the ANN may be represented by a register, a microprocessor configured to process input signals. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. A proposed ANN may be implemented as a Deep Neural Network that has an input layer, an output layer, attention-mechanism blocks, convolutional blocks, residual blocks, and several fully connected hidden layers. The proposed ANN may be particularly useful for flow allocation predictive model generation because the ANN can effectively extract features from the network flow data in linear and non-linear relationships. In some embodiments, the proposed ANN may be implemented by an application-specific integrated circuit (ASIC). The ASICs may be specially designed and configured for a specific AI application and provide superior computing capabilities and reduced electricity and computational resources consumption compared to the traditional CPUs.

FIG. 1 illustrates a network diagram of a system for real-time network traffic optimization using reinforcement learning for bin packing of network flows consistent with the present disclosure.

Referring to FIG. 1, the example network 100 includes control plane node 102 connected to data plane entities 107. The control plane node 102 is configured to host an RL module 104 coupled to the ANN (not shown). The control plane node 102 may receive a network flow data from the network entities 101 and may execute the RL module 104 configured to generate a predictive model 105. The model 105 may provide for modelling of a network (entities 101) state space including interface characteristics and traffic characteristics. The RL module 104 may define an action space for allocating specific flows to specific interfaces. In one embodiment, the RL module 104 may establish a reward function that encourages efficient utilization of bandwidth while penalizing packet loss, latency, and jitter. The RL module 104 may provide optimal flow-to-interface allocations based on the modeled state space, action space, and reward function. The control plane node 102 may execute a flow allocation module 108 configured to generate flow allocation policies based on the learned optimal flow-to-interface allocations received from the RL module 104. A data plane entity 107 may be connected to the control plane node 102. The data plane entity 107 may be represented by one or more network devices. The network device(s) of the data plane entity 107 may receive the flow allocation policies from the control plane node 102. The data plane entity 107 may route network traffic flows based on the received flow allocation policies.

In one embodiment, the network device(s) of the data plane entity 107 may collect network statistics including bandwidth utilization, packet loss rates, latency, and jitter for each interface. The data plane entity 107 may to transmit the collected network statistics to the control plane node 102 and the control plane node 102 may use the collected network statistics to update the network state space modeled by the RL module 104. The RL module 104 may periodically retrain to adapt to long-term changes in network conditions.

Note that the data plane entity 107 may be implemented and executed on the processor of the control plane node 102. The flow allocation module 108 may make flow allocation decisions and provides the decisions-related data to the data plane entity 107. Then, the flow allocation decisions made by the flow allocation module 108 may be implemented by the network devices in the data plane entity 107 to route traffic flows within the network of the entities 101.

In one embodiment, RL module 104 may model the interface characteristics including but not limited to bandwidth utilization per interface, current packet loss rates per interface, and current latency and jitter per interface. Additionally, the modeled by the RL module 104 traffic characteristics may include size and type of each traffic flow, and priority of traffic flows.

In one embodiment, the reward function established by the reinforcement learning module may be defined as a combination of a positive reward for effectively utilizing available bandwidth and a penalty for packet loss, excessive latency, and jitter as discussed above. The RL module 104 may implements Q-Learning or a variant thereof and may uses a deep reinforcement learning framework with a neural network (e.g., the ANN) to approximate Q-values or policy. The RL module 104 may be implemented using a deep Q-network (DQN) architecture.

In one disclosed embodiment, the neural network of the RL module 104 may take as input the interface characteristics, traffic characteristics, and current flow-to-interface allocations, and may output a probability distribution over possible flow-to-interface allocations. As discussed above, the RL module 104 may use experience replay to store transitions in a replay buffer and sample the transactions for training.

In one embodiment, the RL module 104 may use a separate target network to stabilize training by periodically updating its weights. The RL module 104 may minimize a temporal difference error as a loss function for training the neural network. The control plane node 102 may execute a simulation module (not shown) configured to simulate network traffic flows with varying characteristics and simulate stochastic changes in interface conditions. The RL module 104 may employ an E-greedy policy for exploration or a stochastic policy for proximal policy optimization. The RL module 104 may use a prioritized experience replay to prioritize transitions with higher temporal difference error for sampling. In one example, the RL module 104 may employ a multi-agent approach where each agent manages flows for a specific interface, and agents coordinate to optimize global performance. In one embodiment, the control plane node 102 may implement a separate predictive module (not shown) configured to forecast traffic patterns and proactively adjust flow allocations.

In one embodiment, the control plane node 102 may host a performance monitoring module (not shown) configured to receive the network statistics collected by the data plane entity 107 and to feed back the network statistics to the RL module 104 to refine the flow allocation policies. Note that the RL module may operates asynchronously from packet forwarding performed by the network devices in the data plane entity 107. According to the disclose embodiments, the flows may be, advantageously, routed without cross-referencing the routing table.

FIG. 2 illustrates a network diagram of a system including detailed features of a control plane node consistent with the present disclosure.

Referring to FIG. 2, the example network 200 includes the control plane node 102 connected to the network entities 101 (see FIG. 1) to receive the network flow data 202.

The control plane node 102 is configured to host the RL module 104. As discussed above with respect to FIG. 1, the control plane 102 may receive the network flow data 202. In one embodiment, the control plane 102 may receive network statistics-related data from the data plane entity 107 as discussed in details in the description of FIG. 1 above.

The control plane node 102 may receive a network flow data from the network entities 101 and may execute the RL module 104 configured to generate a predictive model 105. The model 105 may provide for modelling of a network (entities 101) state space including interface characteristics and traffic characteristics. The RL module 104 may define an action space for allocating specific flows to specific interfaces. In one embodiment, the RL module 104 may establish a reward function that encourages efficient utilization of bandwidth while penalizing packet loss, latency, and jitter. The RL module 104 may provide optimal flow-to-interface allocations based on the modeled state space, action space, and reward function. The control plane node 102 may execute a flow allocation module 108 configured to generate flow allocation policies based on the learned optimal flow-to-interface allocations received from the RL module 104. A data plane entity 107 may be connected to the control plane node 102. The data plane entity 107 may be represented by one or more network devices. The network device(s) of the data plane entity 107 may receive the flow allocation policies from the control plane node 102. The data plane entity 107 may route network traffic flows based on the received flow allocation policies.

As discussed above, the data plane entity 107 may transmit the collected network statistics to the control plane node 102 and the control plane node 102 may use the collected network statistics to update the network state space modeled by the RL module 104. The RL module 104 may periodically retrain to adapt to long-term changes in network conditions.

While this example describes in detail only one control plane node 102, multiple such nodes may be connected to the network. It should be understood that the control plane node 102 may include additional components and that some of the components described herein may be removed and/or modified without departing from a scope of the control plane node 102 disclosed herein. The control plane node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the control plane node 102 may include multiple processors, multiple cores, or the like, without departing from the scope of the control plane node 102 system.

The control plane node 102 may also include a non-transitory computer readable medium 212 that may have stored thereon machine-readable instructions executable by the processor 204. Examples of the machine-readable instructions are shown as 214-226 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to implement a reinforcement learning (RL) module 104. The processor 204 may fetch, decode, and execute the machine-readable instructions 216 to cause the RL module 104 to model a network state space comprising interface characteristics and traffic characteristics. The processor 204 may fetch, decode, and execute the machine-readable instructions 218 to cause the RL module 104 to define an action space for allocating specific flows to specific interfaces. The processor 204 may fetch, decode, and execute the machine-readable instructions 220 to establish a reward function that encourages efficient utilization of bandwidth while penalizing packet loss, latency, and jitter.

The processor 204 may fetch, decode, and execute the machine-readable instructions 222 to cause the RL module 104 to learn optimal flow-to-interface allocations based on the modeled state space, action space, and reward function. The processor 204 may fetch, decode, and execute the machine-readable instructions 224 to implement a flow allocation module 108. The processor 204 may fetch, decode, and execute the machine-readable instructions 226 to cause the flow allocation module 108 to generate flow allocation policies based on the learned optimal flow-to-interface allocations. The data plane entity 107 may route network traffic flows based on the received flow allocation policies.

FIG. 3 illustrates a flowchart of a method for network traffic optimization using reinforcement learning for bin packing of network flows consistent with the present disclosure.

Referring to FIG. 3, the method 300 may include one or more of the steps described below. FIG. 3 illustrates a flow chart of an example method executed by the control plane node 102 (see FIG. 2). Some steps are executed by the connected data plane entity (or entities) 107.

It should be understood that method 300 depicted in FIG. 3 may include additional operations and that some of the operations described therein may be removed and/or modified without departing from the scope of the method 300. The description of the method 300 is also made with reference to the features depicted in FIG. 2 for purposes of illustration. Particularly, the processor 204 of the control plane node 102 may execute some or all of the operations included in the method 300.

With reference to FIG. 3, at block 302, the processor 204 may implement a reinforcement learning (RL) module 104 (see FIG. 1). At block 304, the processor 204 may cause the RL module 104 to model a network state space comprising interface characteristics and traffic characteristics. At block 306, the processor 204 may cause the RL module 104 to define an action space for allocating specific flows to specific interfaces. At block 308, the processor 204 may cause the RL module 104 to establish a reward function that encourages efficient utilization of bandwidth while penalizing packet loss, latency, and jitter. At block 310, the processor 204 may cause the RL module 104 to learn optimal flow-to-interface allocations based on the modeled state space, action space, and reward function. At block 312, the processor 204 may implement a flow allocation module 108. At block 314, the processor 204 may cause the flow allocation module 108 to generate flow allocation policies based on the learned optimal flow-to-interface allocations.

Then, the network device(s) of the data plane entity 107 may receive the flow allocation policies from the control plane node 102. The data plane entity 107 may route network traffic flows based on the received flow allocation policies. The data plane entity 107 may implement the flow allocation policies generated by the flow allocation module 108.

FIG. 4 illustrates a further flowchart of a method for network traffic optimization using reinforcement learning for bin packing of network flows consistent with the present disclosure.

Referring to FIG. 4, the method 400 may include one or more of the steps described below. FIG. 4 illustrates a flow chart of an example method executed by the control plane node 102 (see FIG. 2). It should be understood that method 400 depicted in FIG. 4 may include additional operations and that some of the operations described therein may be removed and/or modified without departing from the scope of the method The description of the method 400 is also made with reference to the features depicted in FIG. 2 for purposes of illustration. Particularly, the processor 204 of the control plane 102 may execute some or all of the operations included in the method 400.

With reference to FIG. 4, at block 410, the processor 204 may model interface characteristics comprising bandwidth utilization per interface, current packet loss rates per interface, and current latency and jitter per interface.

At block 412, the processor 204 may model interface characteristics comprising comprise size and type of each traffic flow, and priority of traffic flows. At block 414, the processor 204 may establish a reward function defined as a combination of a positive reward for effectively utilizing available bandwidth and a penalty for packet loss, excessive latency, and jitter.

At block 416, the processor 204 may execute Q-Learning or a variant thereof and use a deep reinforcement learning framework with a neural network to approximate Q-values or policy.

At block 418, the processor 204 may use a neural network that takes as input the interface characteristics, traffic characteristics, and current flow-to-interface allocations, and outputs a probability distribution over possible flow-to-interface allocations. At block 420, the processor 204 may apply experience replay to store transitions in a replay buffer and sample them for training.

At block 422, the processor 204 may connect to separate target network to stabilize training by periodically updating its weights. At block 424, the processor 204 may minimize a temporal difference error as a loss function for training the neural network.

At block 425, the processor 204 may execute simulate module configured to simulate network traffic flows with varying characteristics and simulate stochastic changes in interface conditions. At block 426, the processor 204 may apply an E-greedy policy for exploration or a stochastic policy for proximal policy optimization. At block 428, the processor 204 may execute a prioritized experience replay to prioritize transitions with higher temporal difference error for sampling.

Note that the processor 204 may invoke a multi-agent approach where each agent manages flows for a specific interface, and the agents coordinate to optimize global performance. At block 432, the processor 204 may execute a predictive module configured to forecast traffic patterns and proactively adjust allocations. The processor 204 may execute RL module implemented using a deep Q-network (DQN) architecture. At block 434, the processor 204 may execute RL module to periodically retrain to adapt to long-term changes in network conditions. The processor 204 may execute a flow allocation module to operate in the control plane to make flow allocation decisions.

The processor 204 may further cause the network devices in the data plane to route traffic flows based on flow allocation decisions made by the flow allocation module in the control plane. At block 436, the processor 204 may cause the data plane to transmit the collected network statistics to the control plane and to use the collected network statistics to update the network state space modeled by the reinforcement learning module.

In one embodiment, an ANNN may be used in the RL module 104 for the network flow parameters' modeling and flow allocations generation.

The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
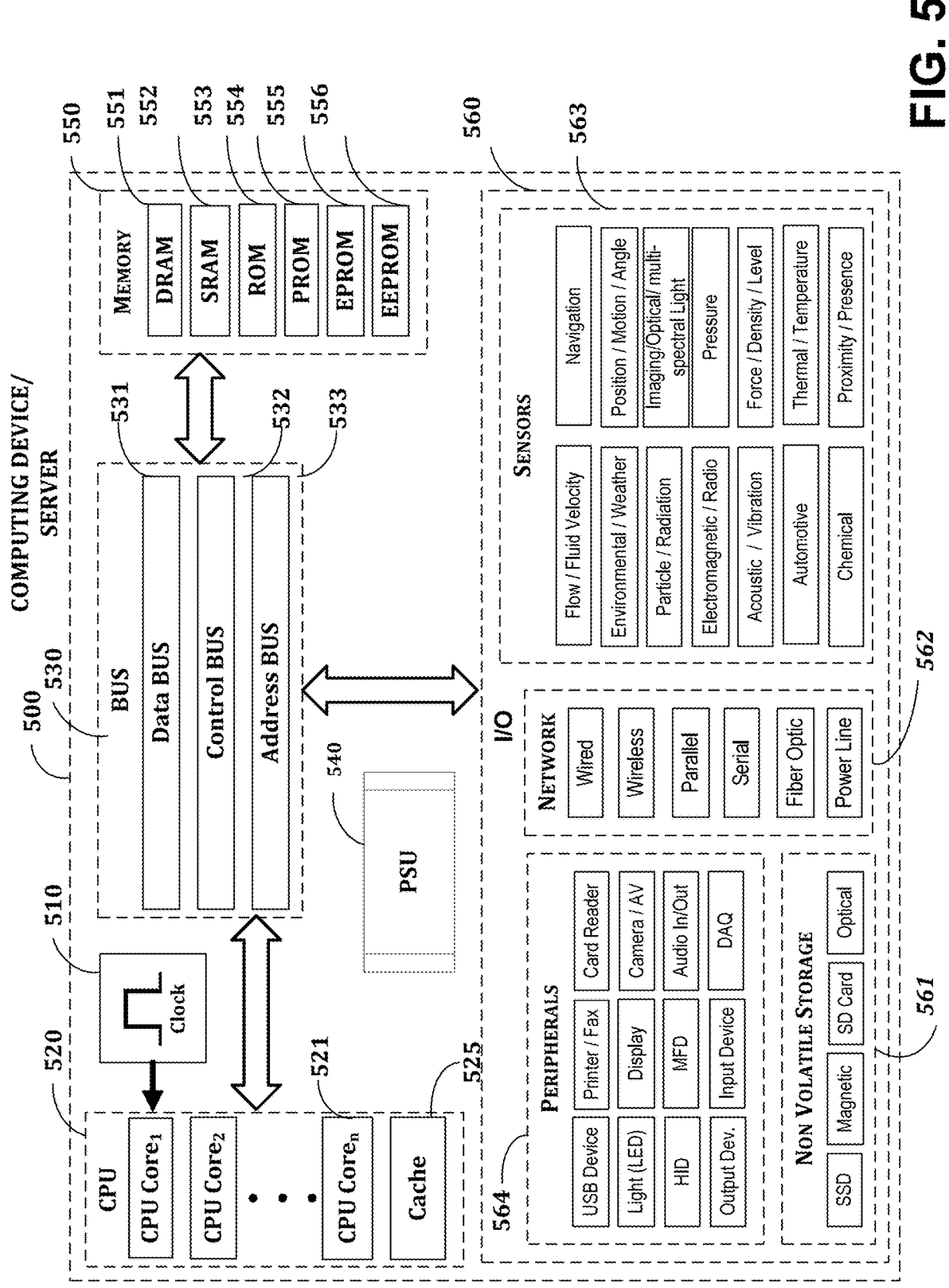
FIG. 5 illustrates a block diagram of a system including a computing device/server for performing the method of FIGS. 3 and 4.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The control plane node 102 (see FIG. 2) may be hosted on a centralized server or on a cloud computing service. Although method 300 has been described to be performed by the control plane node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device/server 500 may be embodied as any of the computing elements illustrated in all of the attached figures, including the control plane node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus

Control bus 532

Address bus 533

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu}Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/

Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (CONTROL PLANE NODE), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G, 5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical CONTROL PLANE NODE sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust CONTROL PLANE NODE/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical CONTROL PLANE NODE sensor, fish counter, frequency domain sensor, CONTROL PLANE NODE detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, CONTROL PLANE NODE meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust CONTROL PLANE NODE temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

EXAMPLES

A1. A system for optimizing network traffic distribution, comprising: a control plane comprising: one or more processors; memory storing instructions that, when executed by the one or more processors, cause the control plane to:

implement a reinforcement learning module configured to: model a network state space comprising interface characteristics and traffic characteristics; define an action space for allocating specific flows to specific interfaces; establish a reward function that encourages efficient utilization of bandwidth while penalizing packet loss, latency, and jitter; learn optimal flow-to-interface allocations based on the modeled state space, action space, and reward function; and implement a flow allocation module configured to: generate flow allocation policies based on the learned optimal flow-to-interface allocations; and a data plane comprising: one or more network devices configured to: implement the flow allocation policies generated by the flow allocation module; collect network statistics including bandwidth utilization, packet loss rates, latency, and jitter for each interface; and route network traffic flows based on the implemented flow allocation policies.

A2. The system of A1, wherein the interface characteristics modeled by the reinforcement learning module comprise bandwidth utilization per interface, current packet loss rates per interface, and current latency and jitter per interface.

A3. The system of any of A1-A2, wherein the traffic characteristics modeled by the reinforcement learning module comprise size and type of each traffic flow, and priority of traffic flows.

A4. The system of any of A1-A3, wherein the reward function established by the reinforcement learning module is defined as a combination of a positive reward for effectively utilizing available bandwidth and a penalty for packet loss, excessive latency, and jitter.

A5. The system of any of A1-A34, wherein the reinforcement learning module implements Q-Learning or a variant thereof.

A6. The system of A5, wherein the reinforcement learning module uses a deep reinforcement learning framework with a neural network to approximate Q-values or policy.

A7. The system of A6, wherein the neural network of the reinforcement learning module takes as input the interface characteristics, traffic characteristics, and current flow-to-interface allocations, and outputs a probability distribution over possible flow-to-interface allocations.

A8. The system of A6, wherein the reinforcement learning module uses experience replay to store transitions in a replay buffer and sample the stored transitions for training.

A9. The system of A6, wherein the reinforcement learning module uses a separate target network to stabilize training by periodically updating its weights.

A10. The system of A6, wherein the reinforcement learning module minimizes a temporal difference error as a loss function for training the neural network.

A11. The system of any of A1-A10, wherein the control plane further comprises a simulation module configured to simulate network traffic flows with varying characteristics and simulate stochastic changes in interface conditions.

A12. The system of any of A1-A11, wherein the reinforcement learning module uses an E-greedy policy for exploration or a stochastic policy for proximal policy optimization.

A13. The system of A8, wherein the reinforcement learning module uses prioritized experience replay to prioritize transitions with higher temporal difference error for sampling.

A14. The system of any of A1-A13, wherein the reinforcement learning module uses a multi-agent approach where each agent manages flows for a specific interface, and agents coordinate to optimize global performance.

A15. The system of any of A1-A14, wherein the control plane further comprises a predictive module configured to forecast traffic patterns and proactively adjust allocations.

A16. The system of any of A1-A15, wherein the reinforcement learning module is implemented using a deep Q-network (DQN) architecture.

A17. The system of any of A1-A16, wherein the reinforcement learning module periodically retrains to adapt to long-term changes in network conditions.

A18. The system of any of A1-A17, wherein the flow allocation module operates in the control plane to make flow allocation decisions.

A19. The system of A18, wherein the flow allocation decisions made by the flow allocation module in the control plane are implemented by the network devices in the data plane to route traffic flows.

A20. The system of any of A1-A19, wherein the data plane is configured to transmit the collected network statistics to the control plane; and the control plane is configured to use the collected network statistics to update the network state space modeled by the reinforcement learning module.

A21. The system of any of A1-A20, wherein the control plane further comprises a performance monitoring module configured to: receive the network statistics collected by the data plane; and feed back the network statistics to the reinforcement learning module to refine the flow allocation policies.

A22. The system of any of A1-A21, wherein the reinforcement learning module operates asynchronously from packet forwarding performed by the network devices in the data plane.

A23. The system of any of A1-A22, wherein the control plane and the data plane are implemented on separate hardware devices.

A24. The system of any of A1-A23, wherein the control plane further comprises an interface module configured to: receive network topology information from the network devices in the data plane; and provide the network topology information to the reinforcement learning module for use in modeling the network state space.

A25. The system of any of A1-A24, wherein the flow allocation module is configured to generate updated flow allocation policies in response to changes in network conditions detected based on the network statistics collected by the data plane.

A26. A method for optimizing network traffic distribution, comprising:

implementing a reinforcement learning (RL) module; modeling, by the RL module, a network state space comprising interface characteristics and traffic characteristics; defining, by the RL module, an action space for allocating specific flows to specific interfaces; establishing, by the RL module, a reward function that encourages efficient utilization of bandwidth while penalizing packet loss, latency, and jitter; learning optimal flow-to-interface allocations based on the modeled state space, action space, and reward function; and implementing a flow allocation module; generating, by the flow allocation module, flow allocation policies based on the learned optimal flow-to-interface allocations; and implementing, in a data pane, the flow allocation policies generated by the flow allocation module; collecting, by at least one network device of the data plane, network statistics including bandwidth utilization, packet loss rates, latency, and jitter for each interface; and routing network traffic flows based on the implemented flow allocation policies.

A27. A non-transitory computer-readable medium comprising instructions, that when read by a processor, cause the processor to perform: implementing a reinforcement learning (RL) module; modeling, by the RL module, a network state space comprising interface characteristics and traffic characteristics; defining, by the RL module, an action space for allocating specific flows to specific interfaces; establishing, by the RL module, a reward function that encourages efficient utilization of bandwidth while penalizing packet loss, latency, and jitter; learning optimal flow-to-interface allocations based on the modeled state space, action space, and reward function; and implementing a flow allocation module; generating, by the flow allocation module, flow allocation policies based on the learned optimal flow-to-interface allocations; and implementing, in a data pane, the flow allocation policies generated by the flow allocation module; collecting, by at least one network device of the data plane, network statistics including bandwidth utilization, packet loss rates, latency, and jitter for each interface; and routing network traffic flows based on the implemented flow allocation policies.

The following is claimed:

1. A system for optimizing network traffic distribution across an equal-cost multi-path (ECMP) set of interfaces, comprising:
a control plane associated with a set of ECMP interfaces comprising:
one or more processors; and
memory storing instructions that, when executed by the one or more processors, cause the control plane to:
perform reinforcement learning operations to:
model a network state space comprising interface characteristics including bandwidth capacity per interface representing bins having capacity constraints, and traffic characteristics including size of each traffic flow representing items of varying sizes to be packed into the bins;
define an action space for allocating specific flows to specific interfaces, wherein each action represents a decision to assign a specific flow to a specific interface to pack the flow into the interface while respecting the capacity constraints;
establish a reward function that encourages efficient utilization of bandwidth while penalizing packet loss, latency, and jitter, wherein the reward function comprises a utilization reward based on a ratio of used bandwidth to total available bandwidth and a penalty that is a weighted combination of packet loss rate, latency, and jitter; and
learn optimal flow-to-interface allocations based on the modeled state space, action space, and reward function; and
perform flow allocation operations to:
generate flow allocation policies based on the learned optimal flow-to-interface allocations; and
dynamically update the flow allocation policies in response to changes in network conditions detected based on collected network statistics, wherein the updated flow allocation policies reassign one or more flows from a first interface to a second interface from the set of ECMP interfaces based on the reward function, the action space, and the state space; and a data plane associated with the set of ECMP interfaces comprising:
one or more network devices configured to:
implement the flow allocation policies generated by the flow allocation operations;
collect the network statistics including bandwidth utilization, packet loss rates, latency, and jitter for each interface;
transmit the collected network statistics to the control plane in real time; and
route network traffic flows based on the implemented flow allocation policies.

2. The system of claim 1, wherein the interface characteristics modeled by the reinforcement learning operations comprise bandwidth utilization per interface, current packet loss rates per interface, and current latency and jitter per interface.

3. The system of claim 1, wherein the traffic characteristics modeled by the reinforcement learning operations comprise size and type of each traffic flow, and priority of traffic flows.

4. The system of claim 1, wherein the reward function established by the reinforcement learning operations is defined as a combination of a positive reward for effectively utilizing available bandwidth and a penalty for packet loss, excessive latency, and jitter.

5. The system of claim 1, wherein the reinforcement learning operations implement Q-Learning or a variant thereof.

6. The system of claim 5, wherein the reinforcement learning operations use a deep reinforcement learning framework with a neural network to approximate Q-values or policy.

7. The system of claim 6, wherein the neural network of the reinforcement learning operations takes as input the interface characteristics, traffic characteristics, and current flow-to-interface allocations, and outputs a probability distribution over possible flow-to-interface allocations.

8. The system of claim 6, wherein the reinforcement learning operations use experience replay to store transitions in a replay buffer and sample the stored transitions for training.

9. The system of claim 6, wherein the reinforcement learning operations use a separate target network to stabilize training by periodically updating its weights.

10. The system of claim 6, wherein the reinforcement learning operations minimize a temporal difference error as a loss function for training the neural network.

11. The system of claim 1, wherein the control plane further comprises simulation operations configured to simulate network traffic flows with varying characteristics and simulate stochastic changes in interface conditions.

12. The system of claim 1, wherein the reinforcement learning operations use an ε-greedy policy for exploration or a stochastic policy for proximal policy optimization.

13. The system of claim 8, wherein the reinforcement learning operations use prioritized experience replay to prioritize transitions with higher temporal difference error for sampling.

14. The system of claim 1, wherein the reinforcement learning operations use a multi-agent approach where each agent manages flows for a specific interface, and agents coordinate to optimize global performance.

15. The system of claim 1, wherein the control plane further comprises predictive operations configured to forecast traffic patterns and proactively adjust allocations.

16. The system of claim 1, wherein the reinforcement learning operations are implemented using a deep Q-network (DQN) architecture.

17. The system of claim 1, wherein the reinforcement learning operations periodically retrain to adapt to long-term changes in network conditions.

18. The system of claim 1, wherein the flow allocation operations operate in the control plane to make flow allocation decisions, the one or more network devices are connected by links to remote network devices at the interfaces of the one or more network devices, and the links connected to the remote network devices are modeled as an equal cost multi-path system.

19. A method for optimizing network traffic distribution across an equal-cost multi-path (ECMP) set of interfaces, comprising:

in a control plane, optimizing network traffic distribution across an equal-cost multi-path (ECMP) set of interfaces by:

implementing reinforcement learning (RL) operations, including:

modeling a network state space comprising interface characteristics including bandwidth capacity per interface representing bins having capacity constraints, and traffic characteristics including size of each traffic flow representing items of varying sizes to be packed into the bins;

defining an action space for allocating specific flows to specific interfaces, wherein each action represents a decision to assign a specific flow to a specific interface to pack the flow into the interface while respecting the capacity constraints;

establishinga reward function that encourages efficient utilization of bandwidth while penalizing packet loss, latency, and jitter, wherein the reward function comprises a utilization reward based on a ratio of used bandwidth to total available bandwidth and a penalty that is a weighted combination of packet loss rate, latency, and litter;

learning optimal flow-to-interface allocations based on the modeled state space, action space, and reward function; and implementing flow allocation operations, including:

generating flow allocation policies based on the learned optimal flow-to-interface allocations; and dynamically updating the flow allocation policies in response to changes in network conditions detected based on collected network statistics, wherein the updated flow allocation policies reassign one or more flows from a first interface to a second interface based on available bandwidth; and implementing, in a data pane, the flow allocation policies generated by the flow allocation operations;

collecting, by at least one network device of the data plane, network statistics including bandwidth utilization, packet loss rates, latency, and jitter for each interface;

transmitting the collected network statistics to the control plane in real time; and routing network traffic flows based on the implemented flow allocation policies.

20. A non-transitory computer-readable medium comprising instructions, that when read by a processor, cause the processor to perform:

in a control plane, optimizing network traffic distribution across an equal-cost multi-path (ECMP) set of interfaces by:

implementing reinforcement learning (RL); operations, including:

modeling a network state space comprising interface characteristics including bandwidth capacity per interface representing bins having capacity constraints, and and traffic characteristics including size of each traffic flow representing items of varying sizes to be packed into the bins;

defining an action space for allocating specific flows to specific interfaces, wherein each action represents a decision to assign a specific flow to a specific interface to pack the flow into the interface while respecting the capacity constraints;

establishing a reward function that encourages efficient utilization of bandwidth while penalizing packet loss, latency, and jitter, wherein the reward function comprises a utilization reward based on a ratio of used bandwidth to total available bandwidth and a penalty that is a weighted combination of packet loss rate, latency, and litter;

learning optimal flow-to-interface allocations based on the modeled state space, action space, and reward function; and implementing flow allocation operations, including:

generating flow allocation policies based on the learned optimal flow-to-interface allocations;

dynamically updating the flow allocation policies in response to changes in network conditions detected based on collected network statistics, wherein the updated flow allocation policies reassign one or more flows from a first interface to a second interface based on available bandwidth; and implementing, in a data pane, the flow allocation policies generated by the flow allocation operations;

collecting, by at least one network device of the data plane, network statistics including bandwidth utilization, packet loss rates, latency, and jitter for each interface;

transmitting the collected network statistics to the control plane in real time; and routing network traffic flows based on the implemented flow allocation policies.

* * * * *